March 15, 1966  N. R. BRAINARD  3,240,388
PUMP AND LEVEL INDICATOR COMBINATION
Filed July 24, 1964
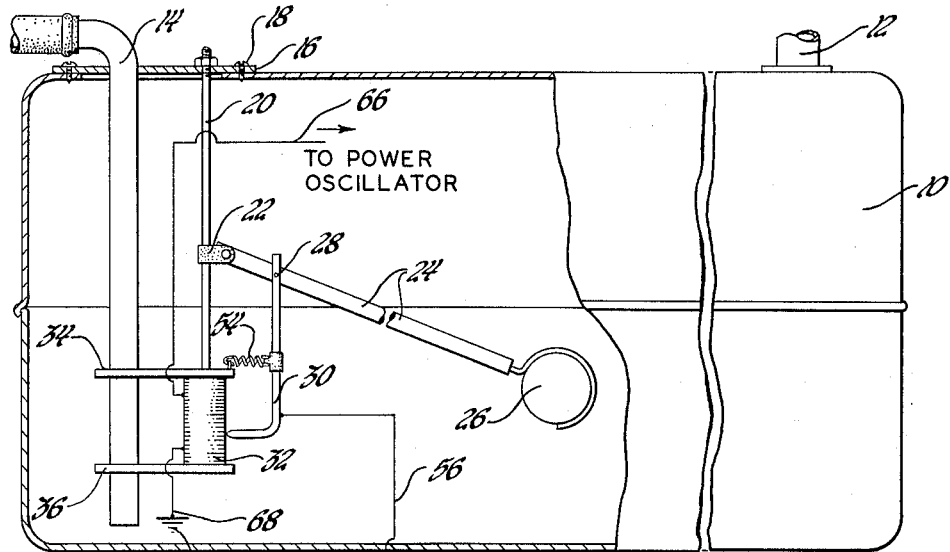
Fig. 1
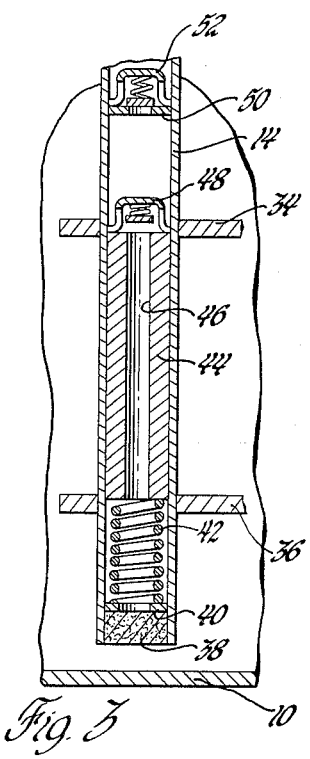
Fig. 3
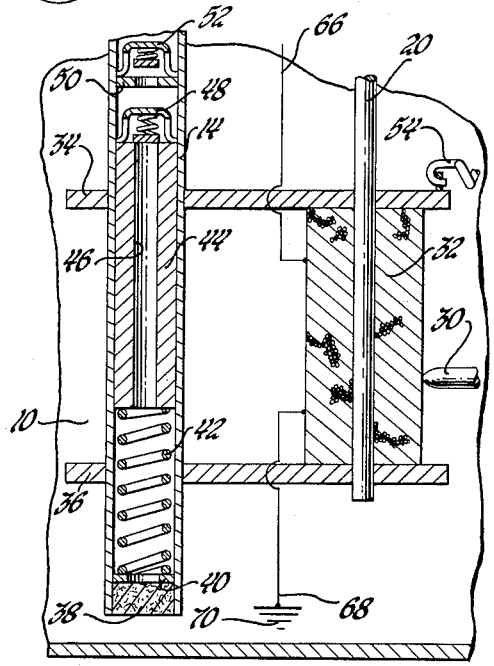
Fig. 2
FULL  HALF  QUARTER
      FULL  FULL
Fig. 4
INVENTOR.
Norman R. Brainard
BY George E. Johnson
ATTORNEY

3,240,388
PUMP AND LEVEL INDICATOR COMBINATION
Norman R. Brainard, Flint, Mich., assignor to General Motors Corporation, Detroit, Mich., a corporation of Delaware
Filed July 24, 1964, Ser. No. 385,006
5 Claims. (Cl. 222—51)

This invention relates to a combination of a pump and level indicator and, more particularly, to a pump and liquid level indicator suitable for installation as a unit in a tank and specially adapted for use with automotive fuel systems.

Solenoid-operated fuel pumps of various types have been utilized heretofore. Such a pump is disclosed in the United States Patent 3,000,321 granted September 19, 1961, in the name of L. C. Parker. Also, float-operated rheostats for indicating liquid levels in tanks have been common. Such an indicator is disclosed in the United States Patent 2,423,603 granted July 8, 1947, in the name of W. McCandless.

It has now been found that such devices may be combined in a single unit more effectively to secure both functions, i.e., the pumping action and liquid level indicating and the object of the present invention is to provide such combination.

A feature of the present invention is an electro-magnetic plunger type pump and a float, both being operated in conjunction with a solenoid to perform pumping and liquid level indicating functions.

This and other important features of the present invention will now be described in detail in the specification and then pointed out more particularly in the appended claims.

In the drawings:

FIGURE 1 is an elevation view of an automotive fuel tank with a portion broken away diagrammatically to illustrate one embodiment of the present invention;

FIGURE 2 is an enlarged sectional view of elements shown in FIGURE 1 with a pump at the top of its stroke;

FIGURE 3 is a view similar to that of FIGURE 2 but showing the pump only in a tank and at the bottom of its stroke; and FIGURE 4 shows a square wave voltage output utilized in effecting operation.

In FIGURE 1 of the drawings, a fuel tank is illustrated at 10 having a filler and vent pipe 12 and a non-magnetic or brass discharge line or conduit indicated at 14 for providing liquid fuel to an engine. A small cover plate 16 fixed to the top of the tank by means of screws 18 is utilized to support the discharge line 14 as well as a magnetic rod 20. The line 14 and the rod 20 are mounted in vertical and parallel positions within the tank so that the bottom of the line 14 terminates very close to the bottom of the tank 10. Midway the length of the rod 20 is mounted a block 22 of insulator material and to this block one end of a lever 24 is pivoted for supporting a float 26. Pivoted at 28 on the arm 24 is a contact member 30 having one end bent into a horizontal position and slidably engaging exposed portions of the consecutive exterior loops of a solenoid coil 32 rigidly held on the bottom end of the rod 20. The coil is confined between two magnetic wall plates 34 and 36 and these are rigidly fixed to the discharge line 14. At the bottom end of the discharge line 14 is located a filter material 38 and immediately above that material is an apertured disc or ring 40 supporting a coil spring 42. The upper end of this spring is in contact with an armature 44 bearing a through passage 46. Affixed to the top end of the armature 44 is a one-way pressure and spring actuated valve arrangement 48 similar to that which is used in automotive fuel pumps of the diaphragm variety much in use at the present time. Affixed to the discharge line 14 a required distance above the uppermost position to be assumed by the valve 48 as an apertured disc 50 which retains a second one-way valve 52.

A spring 54 is utilized resiliently to hold the contact member 30 in sliding engagement with the coil 32 while not providing a current path between the contact member 30 and the wall plate 34 and the contact member 30 is connected by means of a line 56 to a filter 58 which in turn is connected through a gage 60 to ground at 62 and also directly to ground at 64.

A power supply is connected by a line 66 to an upper portion of the coil 32 and a lower portion of the coil is connected by a line 68 to ground as at 70.

The operation of the coil 32 is similar to that of a rheostat and when the solenoid coil is energized intermittently with a power oscillator or current interrupter, a periodic square wave voltage is obtained and as illustrated in the plot of voltage with respect to time as shown in FIGURE 4. As the contact member 30 is moved across the turns of the coil 32 by means of the float 26 as the liquid level changes in the tank 10, the level may be indicated as a function of the height of the square wave. This voltage wave is filtered or averaged in the filter 58 to yield a smooth output voltage thereby being effective to operate the conventional electrical gage 60 which functions much like an ordinary voltmeter except that it is properly calibrated to indicate liquid level. The filter 58 consists of a resistor or capacitor in the configuration of an integrating network whose time constant is significantly greater than the period of the square wave.

The coil 32 could be a single layer coil but the coil illustrated has a winding which begins at its bottom and proceeds in concentric circles in the lower horizontal plane and when the first horizontal plane layer is wound, the second layer begins at the core to form a one wire diameter thickness above the first layer. The winding proceeds in horizontal layers until the bobbin is filled. Stripping along the outer surface of the coil of insulation gives a full range voltage pickoff device. Coil 32 could alternatively be wound around the discharge tube 14.

The operation of the pump is conventional in that the spring 42 is always effective to urge the armature 44 upwardly but this force is intermittently overcome by the lines of flux generated by energization on the solenoid coil 32. When the coil is energized, the armature 44 moves downwardly against the spring 42 and fills the chamber between the two valves 48 and 52 with liquid fuel as the valve 48 will be open and the valve 52 will be closed. When the solenoid 42 is deenergized, a spring 42 forces the armature upwardly with a result that the valve 48 closes and the valve 52 opens, and most of the liquid between the two valves is forced upwardly and out from the discharge line 14.

I claim:

1. An electromagnetic pump having an armature plunger, a float, a gage, a solenoid coil arranged to operate said plunger, a contact connected to ground through said gage, slidable on said coil and linked to said float to move with the latter and along said coil, and a circuit connected intermittently to energize said coil.

2. An electromagnetic pump having an armature plunger, a float mounted close to said pump and adapted to move in a vertical direction, a gage calibrated to show liquid level as determined by said float, a solenoid coil arranged to operate said plunger, a contact slidable on said coil and linked to said float to move with the latter, and a square wave voltage circuit connected through said coil to ground and also through a portion of said coil, said contact and gage to ground.

3. An electromagnetic pump having an armature plunger, a float mounted close to said pump for immersion in a common liquid, a gage calibrated to show liquid level and operable in accordance with current passed through the gage, a solenoid coil positioned to operate said plunger, a contact slidable on said coil and linked to said float to move simultaneously with the latter, and an intermittent voltage supply connected through said coil to ground and also through a portion of said coil, said contact and gage to ground.

4. A pump, float and gage arrangement as set forth in claim 3, spring means being included in said pump to operate said plunger while said coil is not energized.

5. An electromagnetic pump having a non-magnetic discharge conduit and an armature plunger mounted for reciprocation in said conduit, a spring acting on said armature plunger, a float with a pivoted mounting near said conduit, a gage calibrated to indicate liquid level, a solenoid coil with a magnetic field encompassing said armature plunger, a contact slidable across the turns of said coil and movable with said float, an intermittent power supply connected to ground through said coil and also to ground by way of a portion of said coil, said contact and gage, said discharge conduit and the axis of said coil being parallel, and the arrangement being such that energizing of said coil operates said gage and moves said armature plunger in one direction and said spring urges said armature plunger in the opposite direction.

References Cited by the Examiner

UNITED STATES PATENTS 1,693,114 11/1928 Heany.
2,473,726 6/1949 Payne _____ 103—53 X ROBERT M. WALKER, *Primary Examiner*.